(12) United States Patent
Prerad

(10) Patent No.: US 6,787,258 B2
(45) Date of Patent: Sep. 7, 2004

(54) HYDROGEN BASED ENERGY STORAGE APPARATUS AND METHOD

(76) Inventor: Vladimir Prerad, 955 Country Club Dr., Cincinnati, OH (US) 45245

( * ) Notice: Subject to any disclaimer, the term of this patent is extended or adjusted under 35 U.S.C. 154(b) by 309 days.

(21) Appl. No.: 10/091,308

(22) Filed: Mar. 5, 2002

(65) Prior Publication Data

US 2003/0170516 A1 Sep. 11, 2003

(51) Int. Cl.[7] .......................... H01M 8/02; H01M 8/18; C25B 15/08; F02B 43/08
(52) U.S. Cl. ............................ 429/21; 429/12; 429/17; 204/237; 123/3
(58) Field of Search .............................. 429/12, 17, 21; 204/237; 123/3

(56) References Cited

U.S. PATENT DOCUMENTS

| | | | |
|---|---|---|---|
| 4,161,657 A | | 7/1979 | Shaffer, Jr. |
| 4,246,080 A | | 1/1981 | Shinn |
| 4,323,442 A | * | 4/1982 | Lantin et al. ............... 204/237 |
| 4,326,013 A | | 4/1982 | Jacobi et al. |
| 4,341,607 A | | 7/1982 | Tison |
| 4,749,462 A | * | 6/1988 | Bachot et al. .............. 204/237 |
| 5,302,270 A | * | 4/1994 | Yamauchi et al. .......... 204/265 |
| 5,512,145 A | | 4/1996 | Hollenberg |
| 5,783,051 A | * | 7/1998 | Hirai et al. ................. 204/254 |
| 5,810,284 A | | 9/1998 | Hibbs et al. |
| 6,093,306 A | | 7/2000 | Hanrahan et al. |

FOREIGN PATENT DOCUMENTS

| | | | | |
|---|---|---|---|---|
| EP | 1243671 A1 | * | 9/2002 | .......... C25B/15/08 |
| JP | 2001152378 A | * | 6/2001 | ............. C25B/9/00 |

OTHER PUBLICATIONS

Fortune, "The coming hydrogen economy" Beyond Oil, Nov. 12, 2001, 6 pp.
Bose, Tapan K., et al., "Hydrogen Production from a Standalone Wind Energy System", AWEA Annual Meeting, Jun. 3, 2001, 6 pp.

* cited by examiner

Primary Examiner—Gregg Cantelmo
(74) Attorney, Agent, or Firm—Richard V. Westerhoff; Eckert Seamans Cherin & Mellott, LLC

(57) ABSTRACT

Utility power is wheeled to distributed hydrogen energy storage systems during off peak periods where it is used in an electrolyzer to disassociate water into hydrogen and oxygen. The hydrogen at least is stored for use in a fuel cell or combustion engine driven generator to produce locally generated electricity during peak periods or power interruptions. Efficient electrolysis and gas storage are obtained by operating the electrolyzer at high pressures through two flow loops in which the hydrogen and oxygen produced in the electrolyzer pass to separate gas-water columns and force water into the electrolyzer. When the desired high pressure is reached, the gases are bled off into a series of storage tanks.

11 Claims, 5 Drawing Sheets

HYDROGEN BASED ENERGY STORAGE APPARATUS AND METHOD

BACKGROUND OF THE INVENTION

1. Field of the Invention

This invention relates to the storage of energy for future use, and more particularly, to apparatus and a method for converting electrical energy during off-peak periods of low demand to hydrogen and oxygen that are stored for later conversion back into electrical energy during peak periods of high demand. It also relates to such a system and method that operates at self generated high pressure for efficient energy conversion and storage of the gases.

2. Background Information

Electric utilities have large installed capacity to met peak demand and the required safety margin. Most of the time, especially at night and weekends, only a fraction of that capacity is required to meet nominal demand. In fact, some of the peaking units operate only a few hours a year. In addition, utilities purchase blocks of peak power on a take-or-pay basis to ensure sufficient power during their highest demand periods, such as mid-summer heat waves. In some instances, bottlenecks in the transmission system complicate the task of delivering power where it is needed during periods of peak demand.

In addition to the problems associated with economically meeting peak demand, utilities have endeavored to improve performance through load leveling in order to operate certain of their equipment at maximum efficiency. U.S. Pat. No. 6,093,306 describes a complex system for abating emissions and providing load leveling for fossil fuel plants. The process produces hydrogen through the electrolysis of water during off-peak periods for use in a fuel cell at the plant to generate electricity during peak periods, which is added to the plant output. While this allows the fossil fuel plant to operate more efficiently and cleanly, it does not address the problems of transmission constriction or peaking.

It has also been suggested that renewable energy sources, such as solar and wind energy, can be used to generate hydrogen gas which is then used to generate electricity in fuel cells during periods when the sunlight or wind is not available or insufficient to produce electricity. Again, neither of these approaches address the problems of transmission restriction or peaking.

There is room, therefore, for improvements in the configuration and operation of systems for generating and distributing electric power.

SUMMARY OF THE INVENTION

In accordance with the invention, electric energy generated by a primary electric power source is transmitted to a specified location remote from a utility generating station where it is stored by using it to disassociate water into hydrogen and oxygen, which are stored for later conversion of at least the hydrogen into locally generated electricity in a hydrogen to electricity converter. The utility generated electricity is wheeled to the specified location, such as a user site, a substation, or on a distribution line during off-peak periods and the stored gases are used to produce the locally generated electricity during peak periods. Thus, the low cost power generated by the utility during low demand periods can be converted to higher value electric power during peak periods. In addition, the adverse effects of constriction on the transmission system are ameliorated by reducing the transmission capacity required during peak demand periods. This advantage is enhanced by wheeling the utility generated power during low demand periods to a plurality of distributed specified locations remote from the utility generating station. Also, by providing distributed generation using stored gas, the effects of transmission interruptions, such as for example by storms, are mitigated.

As another aspect of the invention, the apparatus which generates the deferred electric power comprises an electrolyzer energized by the primary electric power source to disassociate water into hydrogen and oxygen, and a gas collection system that includes a first gas-water column connected to the electrolyzer to form a first flow loop in which the hydrogen produced in the electrolyzer passes to the first gas-water column and forces water from the first gas-water column into the electrolyzer. This gas collection system further includes a second gas-water column connected to the electrolyzer to form a second flow loop in which oxygen produced in the electrolyzer passes to the second gas-water column and forces water from the second gas-water column into the electrolyzer. A gas storage system stores the hydrogen from the first flow loop and the oxygen from the second flow loop. A hydrogen to electricity converter, such as fuel cell or combustion engine driven generator, converts the stored hydrogen back into electricity using either the stored oxygen or ambient oxygen. In the later case, the collected oxygen can be utilized or sold for other purposes. A valving system maintains the pressure of the hydrogen and oxygen at a selected pressure above about 1,000 psi by controlling the flow of hydrogen from the first flow loop and oxygen from the second flow loop to the gas storage system. Thus, the apparatus operates at high pressure without additional pressurizing equipment for efficient conversion and gas storage. This pressure can be regulated to between about 2,500–5,000 psi with the exemplary apparatus operating at about 3,000 psi.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
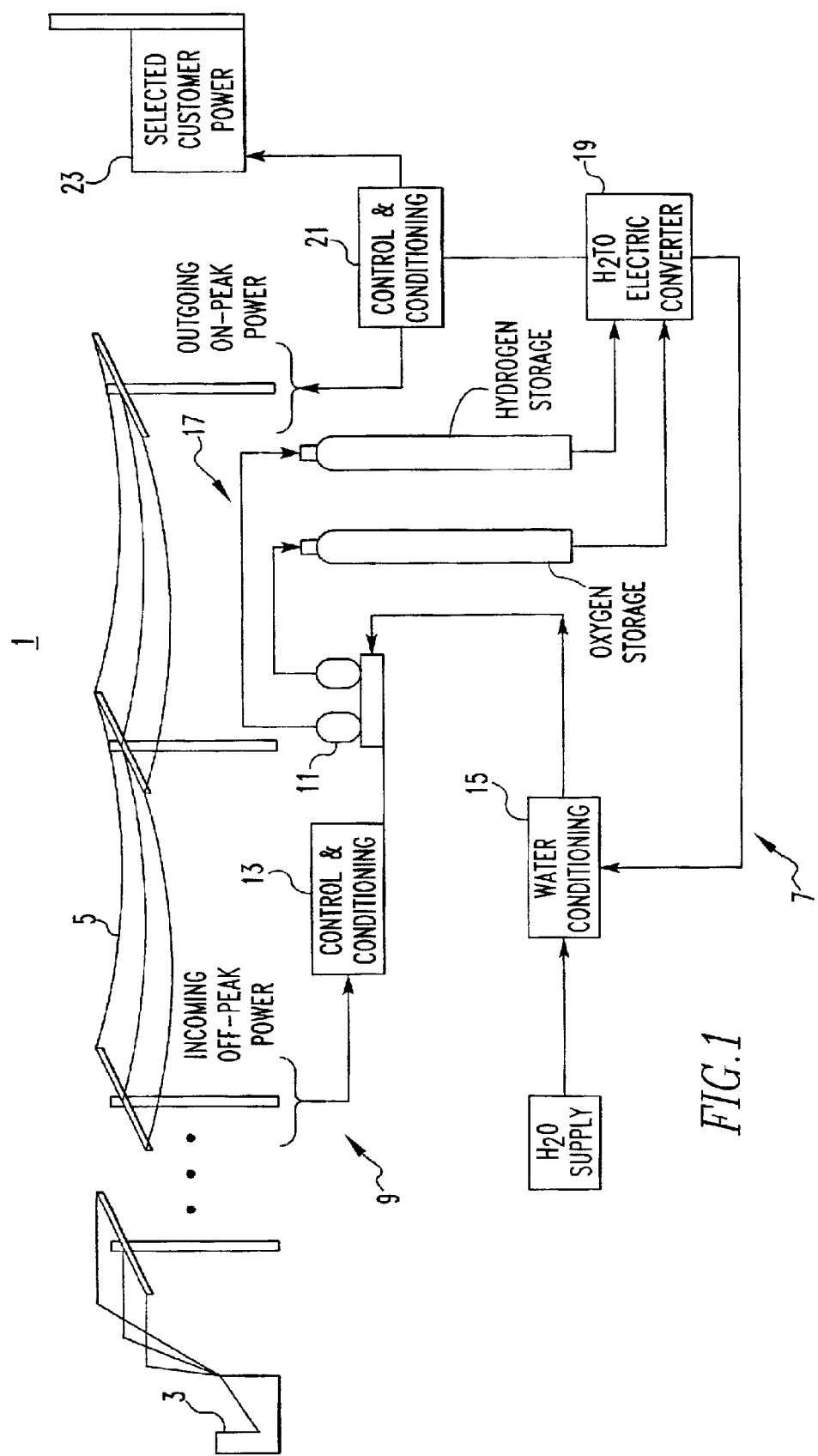
FIG. 1 is a schematic diagram of an electric power system incorporating a hydrogen-based energy storage system in accordance with the invention.

FIG. 1 illustrates an electric power system 1 in which a primary electric power source 3 such as a utility generating station provides electric power to a transmission system 5. The utility generating plant 3 can be a fossil-fueled plant, a nuclear plant, a hydroelectric plant or a renewable power source such as a wind generator or solar generator. The source of the primary power provided to the transmission system is not critical and there can be multiple primary power sources. In accordance with the invention, a hydrogen-based energy storage system 7 is located at a specified location 9 on the transmission system 5.

The hydrogen-based energy storage system 7 includes an electricity-to-hydrogen converter 11 energized by power provided from the transmission system 5 through an incoming power control and conditioning unit 13, which among other things, rectifies the multiphase transmission line power. The electricity-to-hydrogen converter 11 disassociates water provided through a water conditioning unit 15 into hydrogen gas and oxygen gas which are collected and stored separately in a gas storage system 17. In accordance with one aspect of the invention, electric power from the utility generating station 3 is wheeled over the transmission system 5 to the hydrogen-based energy storage system 7 for conversion into hydrogen and oxygen during off-peak periods. At least the stored hydrogen is supplied during peak periods to a hydrogen-to-electricity converter 19 such as a fuel cell or a combustion engine driven generator to generate locally generated electricity, which can be supplied by an outgoing power control and conditioning unit 21 back to the transmission system 5 to provide the peaking power. In addition to providing peaking power, the hydrogen-based energy storage system 7 helps to overcome the effects of bottlenecks in the transmission system 5 during peak periods by providing distributed power. Where the hydrogen-based energy storage system 7 is co-located with a customer 23, the locally generated electricity can be added to the electricity drawn by the customer directly from the transmission system 5 to meet the power requirements of the customer during periods of high demand. In addition, the hydrogen-based energy storage system 7 can provide power to the transmission system and the local customers when there are interruptions in power delivery over the transmission system such as during storm outages. The output control and conditioning unit 21 can include an inverter for converting the dc power produced by a fuel cell or by a combustion engine driven dc generator into multiphase ac power. Typically, the combustion engine driven generator would have an ac output. The water produced as a byproduct by a fuel cell can be fed back to the electricity-to-hydrogen converter 11.

Figure 2:
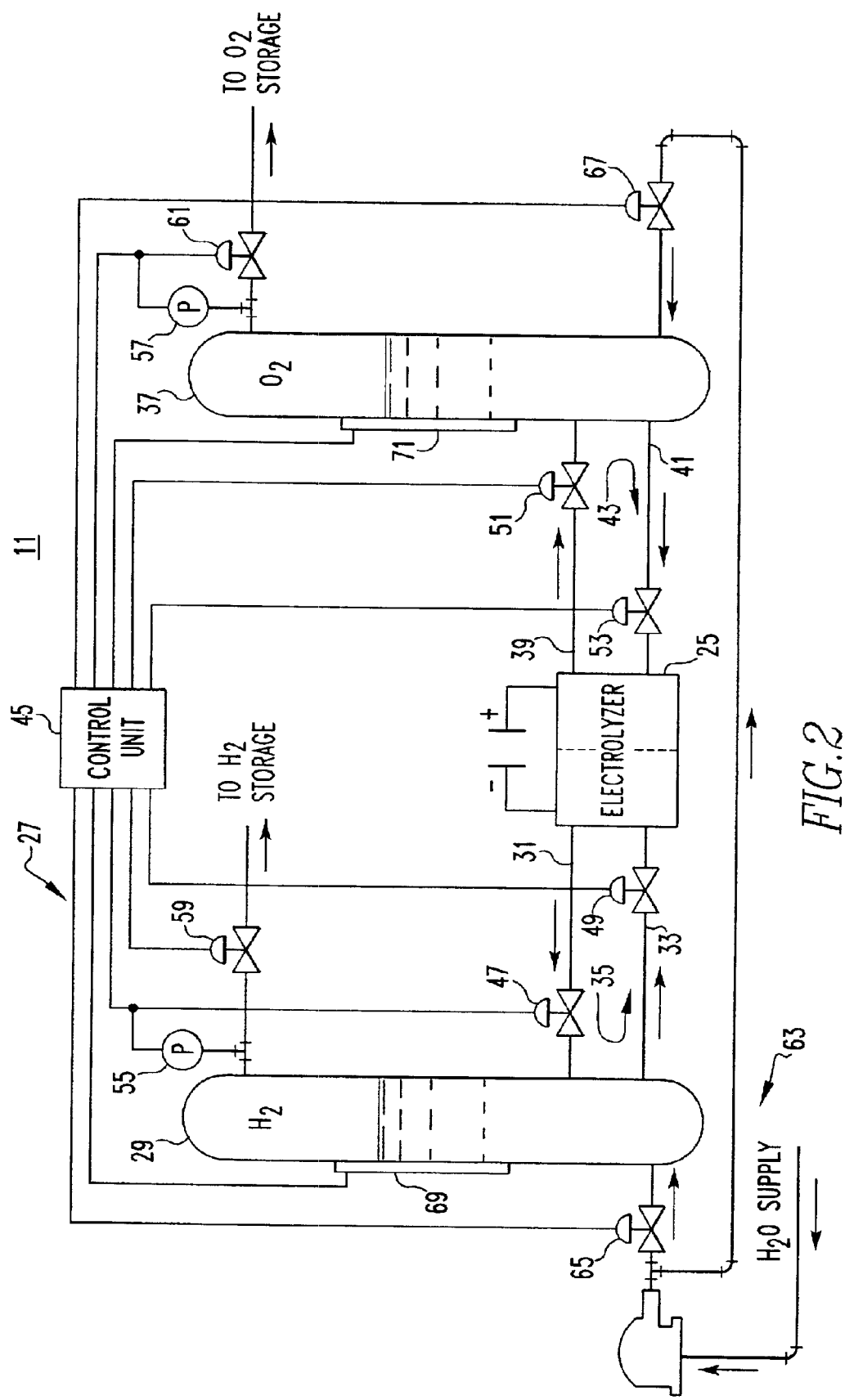
FIG. 2 is a schematic diagram of a basic embodiment of the electricity-to-hydrogen converter section of the hydrogen-based energy storage system.

FIG. 2 illustrates in more detail the electricity-to-hydrogen converter 11. This converter 11 includes an electrolyzer 25 which uses the dc electric power provided by the power conditioning and control unit 13 to disassociate water into hydrogen and oxygen. A gas collection system 27 includes a first gas-water column 29 which is connected to the electrolyzer 25 through a pipe 31 to receive the hydrogen gas which accumulates at the cathode of the electrolyzer. A second pipe 33 between the first gas-water column 29 and the electrolyzer 25 completes a first flow loop 35 in which hydrogen produced in the electrolyzer 25 passes to the first gas-water column 29 and forces water in the column into the electrolyzer. The gas collection system 27 includes a second gas-water column 37 is connected to the electrolyzer by an oxygen pipe 39 and a water pipe 41 to form a second flow loop 43 in which oxygen gas, which accumulates at the anode of the electrolyzer, passes into the second gas-water column 37 and forces water from this second gas-water column back to the electrolyzer. A control unit 45 operates valves 47, 49, 51 and 53 in the pipes 31, 33, 39 and 41, respectively, to establish these flow loops during gas generation by the electrolyzer 25. The control unit 45 also monitors the pressure in the first gas-water column 29 sensed by the pressure sensor 55 and the gas pressure in the second gas-water column 37 sensed by the pressure sensor 57 for use in controlling the operation of valves 59 and 61 that control the flow of hydrogen and oxygen, respectively, to the gas storage system. In accordance with the invention, the pressure is permitted to build up to at least about 1000 psi, and for better efficiency, is maintained at about 2,500 to about 5,000 psi. The exemplary system operates at about 3,000 psi. This self-developed high pressure allows the electrolyzer 25 to operate more efficiently and also provide for more efficient gas storage without the need for separate pressurizing equipment.

The electricity-to-hydrogen converter 11 illustrated in FIG. 2 is a batch system. The first and second gas-water columns 29 and 37 are filled to a specified level with water from a water supply system 63 by the control unit 45 operating valves 65 and 67. As shown in FIG. 1, the water for charging the gas-water columns 29 and 37 can include the water produced when a fuel cell is used as the hydrogen-to-electricity converter as supplemented by an incoming water supply. Operation of the electrolyzer 25 is terminated and the first and second gas-water columns 29 and 37 are recharged when water level sensors 69 and 71 detect a predetermined low water level state.

In operation, when the gas-water columns 29 and 37 are fully charged, the valves 65 and 67 are closed while the valves 47, 49, 51 and 53 are opened. The valves 59 and 61 are initially closed. The electrolyzer 25 is energized with the hydrogen gas produced flowing in the first loop 35 into the first gas-water column 29 to force additional water into the electrolyzer and with the oxygen similarly displacing water in the second gas-water column 37. When the gas pressures in the gas-water columns 29 and 37 build up to the desired high pressure, the valves 59 and 61 are also opened to maintain that pressure by diverting the gases to the gas storage system 17. When the low water level is sensed in the gas-water columns 29 and 37, the electrolyzer is de-energized and the valves 47, 49, 51 and 53 are closed. The gas pressure is bled off and the valves 59 and 61 are closed while the valves 65 and 67 are opened to recharge the gas-water columns with water.

Figure 3:
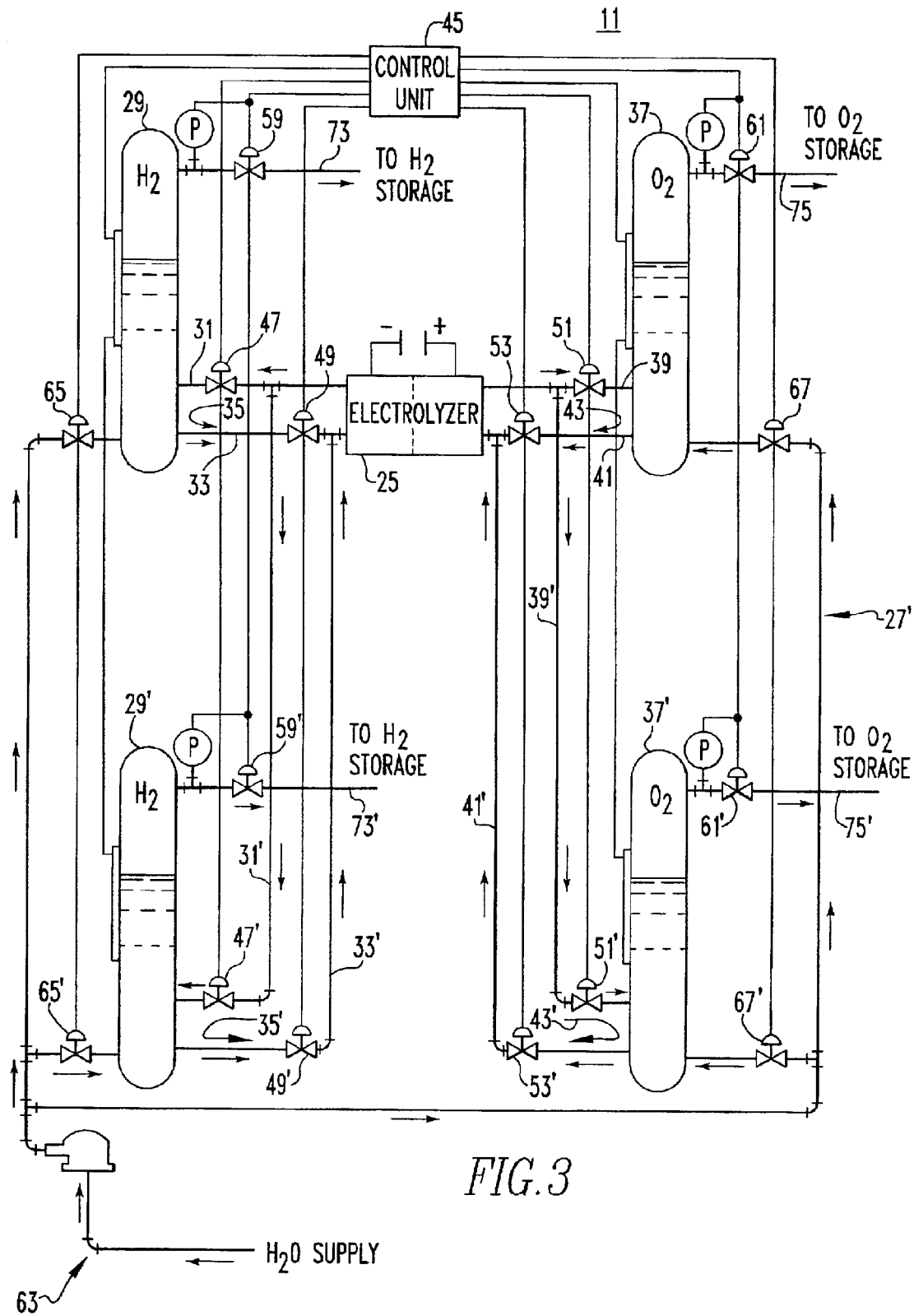
FIG. 3 is a schematic diagram of another embodiment of the electricity-to-hydrogen conversion section.

FIG. 3 illustrates another embodiment of the electricity-to-hydrogen converter 11 having a dual gas collection system 27' that includes an additional first gas-water column 29' connected to the electrolyzer to form an additional first flow loop 35' and an additional second gas-water column 37' similarly connected to the electrolyzer to form an additional second flow loop 43'. These additional flow loops 35' and 43' are formed by similar piping and valves as the first and second flow loops with the components identified by the same reference characters primed. With this arrangement, half of the gas collection system containing a first gas-water column and a second gas-water column is available for collecting the gases produced by the electrolyzer while the other first gas-water column and the other second gas-water column are being recharged. Electrolysis can be maintained continuously with a transition from one set of gas-water columns to the other.

Figure 4:
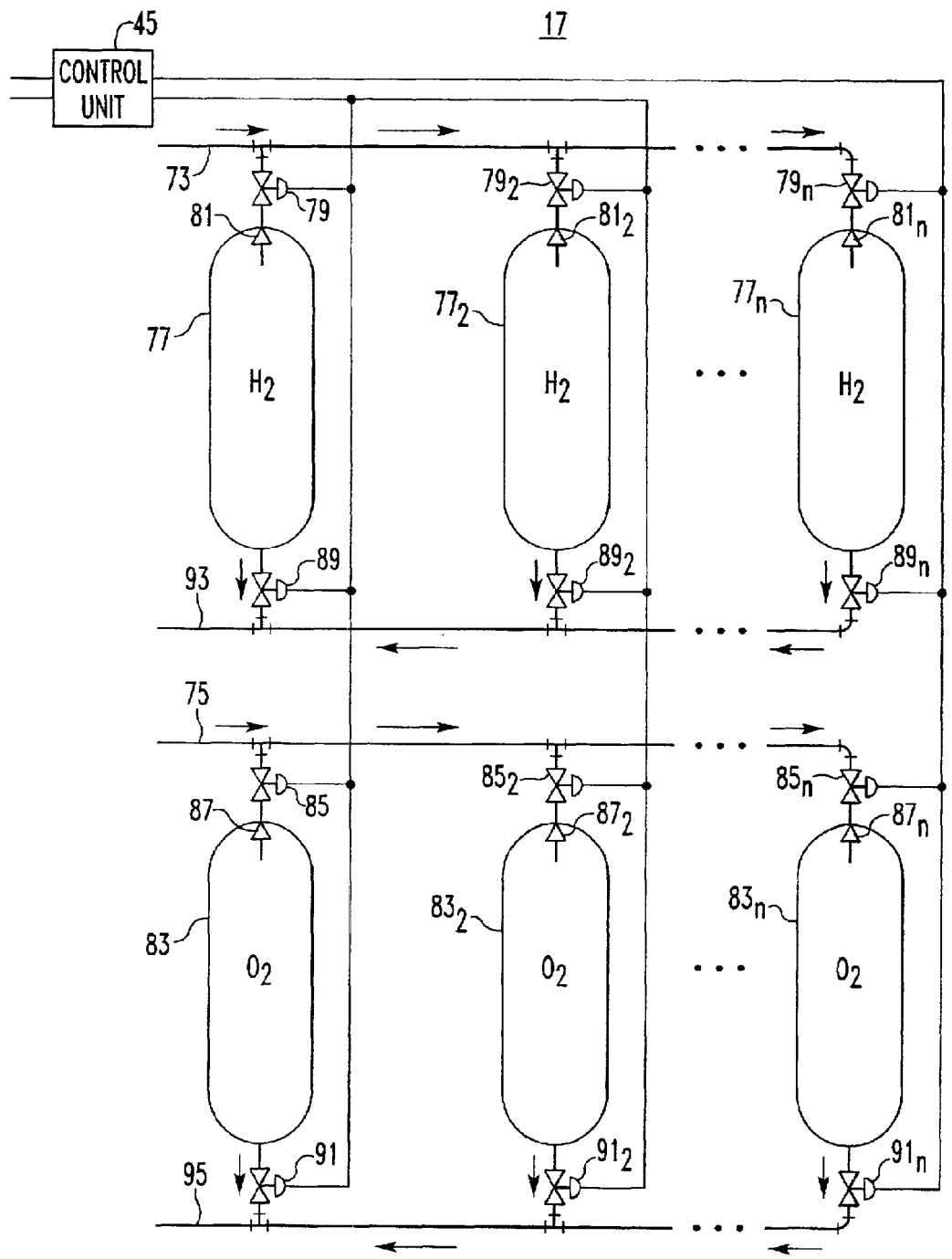
FIG. 4 is a schematic view of a modified embodiment of the gas storage portion of the system.

FIG. 4 illustrates an embodiment of the gas storage system 17, which includes at least one hydrogen storage tank 77 that receives hydrogen gas from the electricity-to-hydrogen converter 11 through the hydrogen line 73 and control valve 79. A non-return valve 81 prevents backfeeding of hydrogen and maintains the pressure of the stored gas. Similarly, an oxygen storage tank 83 receives oxygen from the electricity-to-hydrogen converter 11 through the oxygen line 75, control valve 85, and non-return valve 87. The hydrogen and oxygen are stored until needed whereupon the valves 89 and 91 are opened to provide hydrogen and oxygen to the fuel cell (or combustion engine driven generator) through lines 93 and 95, respectively. Depending upon the requirements of the gas storage system 17, a plurality of hydrogen storage tanks $79_2$–$79_n$ and oxygen storage tanks $83_2$–$83_n$ can in like manner be connected to the hydrogen and oxygen supply lines 73 and 75 and the output lines 93 and 95, respectively. As mentioned previously, at least the hydrogen is used to generate the locally generated electricity. The stored oxygen can also be used for this purpose or, where ambient oxygen is used in the hydrogen-to-electricity converter, the stored oxygen can be used for other purposes or sold. While the hydrogen storage tanks 77 and the oxygen storage tanks 83 are shown in FIG. 4 as having the same volume, the tanks 83 can be half the volume, or be half as many as the tanks 77, because twice as much hydrogen as oxygen by volume is produced in the disassociation of water. With the multitank system, the filled tanks can be maintained at the high system pressure, e.g., about 3,000 psi, while an empty tank for each gas is used to bleed off pressure from the gas-water columns 29 and 37 for recharging.

Figure 5:
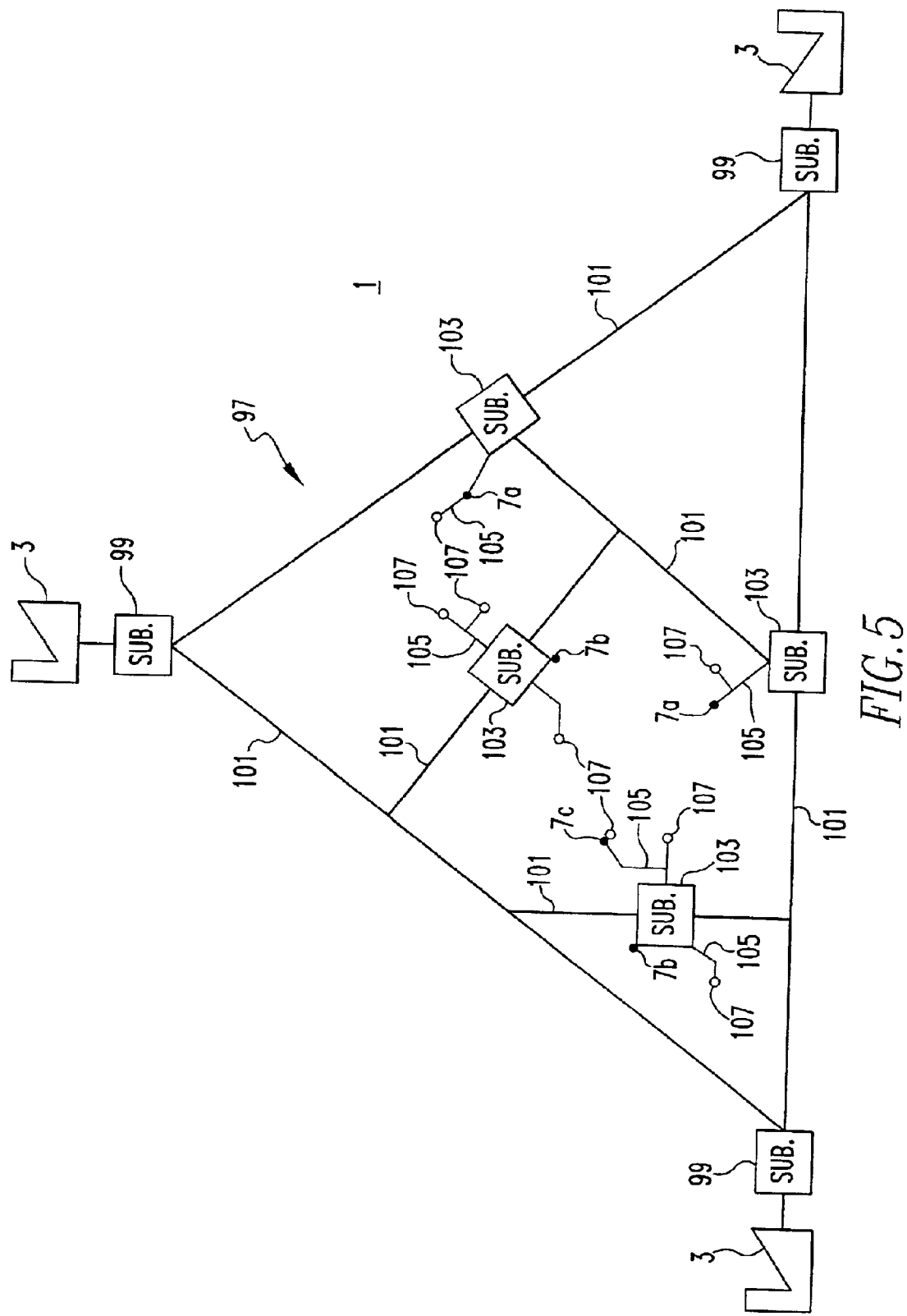
FIG. 5 is a schematic diagram illustrating a distributed hydrogen-based energy storage system in accordance with the invention.

FIG. 5 illustrates an electric power system 1 in which three utility power plants 3 provide electric power to a power grid 97 through substations 99. The grid 97 has numerous interconnected transmission lines 101 providing power through additional substations 103 to distribution systems 105 servicing a number of customers 107. In addition to the problem of supplying sufficient power to meet the requirements of all the customers during peak periods, there can also be constrictions in the grid transmission lines 101 which limit the ability to meet all the needs of all of the customers during peak periods even though there may be sufficient capacity at the utility power plants. For either or both of these reasons, the system illustrated in FIG. 5 has distributed hydrogen-based energy storage systems 7 located throughout the network 97 remotely from the utility generating plants 3. These distributed hydrogen-based energy storage systems can be separately sited such as at 7a, may be sited at a substation such as 7b, or co-located with a customer such as at 7c. With such an arrangement, electric power is wheeled to these distributed hydrogen-based energy storage systems 7a–7c where the hydrogen generated is stored for use during periods of peak demand, when there are constrictions in the transmission system and when there is interruption in the delivery of utility generated power to a portion of the power grid.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for storing energy generated by a primary electric power source and for regenerating electricity from the stored energy, the apparatus comprising:

an electrolyzer energized by the primary electric power source to disassociate water into hydrogen and oxygen;

a gas collection system comprising:

a first gas-water column connected to the electrolyzer to form a first flow loop in which the hydrogen produced in the electrolyzer passes to the first gas-water column and forces water from the first gas-water column into the electrolyzer;

a second gas-water column connected to the electrolyzer to form a second flow loop in which oxygen produced in the electrolyzer passes to the second gas-water column and forces water from the second gas-water column into the electrolyzer; and a gas storage system connectable to receive and store hydrogen from the first flow loop and oxygen from the second flow loop;

a hydrogen-to-electricity converter connectable to receive at least hydrogen from the gas storage system and to generate electricity therefrom; and a valving system maintaining pressure of the hydrogen in the first flow loop and pressure of the oxygen in the second flow loop at a selected pressure above about 1,000 psi by controlling flow of hydrogen from the first flow loop and oxygen from the second flow loop to the gas storage system.

2. The apparatus of claim 1 wherein the valving system maintains the pressure in the first flow loop and in the second flow loop at about 2,500–5,000 psi.

3. The apparatus of claim 1 wherein the valving system maintains the pressure in the first flow loop and in the second flow loop at about 3,000 psi.

4. The apparatus of claim 1 wherein the gas collection system comprises an additional first gas-water column forming an additional first loop in which hydrogen from the electrolyzer passes into the additional first gas-water column to force water from the additional first gas-water column into the electrolyzer, an additional second gas-water column forming an additional second flow loop in which oxygen passes from the electrolyzer into the second gas-water column to force water from the second gas water-column into the electrolyzer, and the valving system includes valving alternately connecting the first and second gas-water columns to the electrolyzer and then the additional first gas-water column and the additional second gas-water column to the electrolyzer.

5. The apparatus of claim 1 wherein the gas storage system comprises at least one hydrogen storage tank and at least one oxygen storage tank.

6. The apparatus of claim 4 wherein the at least one hydrogen storage tank has about twice the volume of the at least one oxygen storage tank.

7. The apparatus of claim 6 wherein the at least one hydrogen storage tank comprises a plurality of hydrogen storage tanks and the at least one oxygen storage tank comprises a plurality of oxygen storage tanks.

8. The apparatus of claim 1 wherein the hydrogen-to-electricity converter comprises a fuel cell.

9. The apparatus of claim 8 wherein the fuel cell receives oxygen from the gas storage system as well as hydrogen for use in generating electricity.

10. The apparatus of claim 1 wherein the hydrogen-to-electricity converter is a combustion engine driven generator.

11. The apparatus of claim 10 wherein the combustion engine driven generator receives oxygen from the gas storage system as well as hydrogen for use in generating electricity.

\* \* \* \* \*